(12) United States Patent
Yao et al.

(10) Patent No.: US 12,314,397 B2
(45) Date of Patent: May 27, 2025

(54) SUPPORT OF PCIe DEVICE WITH MULTIPLE SECURITY POLICIES

(71) Applicant: Intel Corporation, Santa Clara, CA (US)

(72) Inventors: Jiewen Yao, Shanghai (CN); David Harriman, Portland, OR (US); Xiaoyu Ruan, Folsom, CA (US); Mahesh Natu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 17/576,650

(22) Filed: Jan. 14, 2022

(65) Prior Publication Data

US 2022/0179961 A1  Jun. 9, 2022

(30) Foreign Application Priority Data

Nov. 3, 2021 (WO) ................ PCT/CN2021/128350

(51) Int. Cl.
  *G06F 13/42* (2006.01)
  *G06F 13/40* (2006.01)
  *G06F 21/57* (2013.01)
  *G06F 21/85* (2013.01)

(52) U.S. Cl.
  CPC ........ *G06F 21/572* (2013.01); *G06F 13/4022* (2013.01); *G06F 13/4221* (2013.01); *G06F 21/577* (2013.01); *G06F 21/85* (2013.01)

(58) Field of Classification Search
  CPC .............. G06F 21/572; G06F 13/4022; G06F 13/4221; G06F 21/577; G06F 21/85; G06F 21/83; G06F 21/84
  See application file for complete search history.

(56) References Cited

U.S. PATENT DOCUMENTS

| | | | |
|---|---|---|---|
| 7,643,495 B2* | 1/2010 | Metsker | H04L 63/0428 370/398 |
| 9,710,418 B2* | 7/2017 | Khatri | G06F 13/4282 |
| 12,182,580 B2* | 12/2024 | Li | G06F 21/85 |
| 2005/0223359 A1 | 10/2005 | Rao Nagaraju et al. | |
| 2012/0042357 A1 | 2/2012 | Mraz | |
| 2012/0215948 A1 | 8/2012 | Dodson | |
| 2019/0281025 A1 | 9/2019 | Harriman et al. | |

(Continued)

OTHER PUBLICATIONS

International Search Report and Written Opinion mailed Jan. 30, 2023 for International Patent Application No. PCT/US2022/045530, 9 pages.

*Primary Examiner* — Amie C. Lin (74) *Attorney, Agent, or Firm* — Compass IP Law PC (57) ABSTRACT

Various embodiments provide apparatuses, systems, and methods for establishing, by a data object exchange (DOE entity) of a peripheral component interconnect express (PCIe) device, a first session for communication between a first host entity of a host device and a first PCIe entity of the PCIe device, and a second session for communication between a second host entity of the host device and a second PCIe entity of the PCIe device. The first session may have a first security policy and be a session of a first connection between the PCIe device and the host device. The second session may have a second security policy and be a session of a second connection between the PCIe device and the host device. Other embodiments may be described and claimed.

20 Claims, 5 Drawing Sheets

(56) References Cited

U.S. PATENT DOCUMENTS

2019/0306134 A1    10/2019    Shanbhogue et al.
2022/0179961 A1     6/2022    Yao et al.
2022/0407740 A1*   12/2022    Cox .................... H04L 12/4633

* cited by examiner

Establishing, by a DOE entity of a PCIe device, a first session for communication between a first host entity of a host device and a first PCIe entity of the PCIe device, wherein the first session has a first security policy and is a session of a first connection between the PCIe device and the host device
405

Establishing, by the DOE entity, a second session for communication between a second PCIe entity of the PCIe device and a second host entity of the host device, wherein the second session has a second security policy that is different than the first security policy and wherein the second session is a session of a second connection between the PCIe device and the host device
410

Identifying, by the DOE entity, whether a message that is to be transmitted from the PCIe device to the host device is related to the first session or the second session based on a connection identifier (ID) indication in the message
415

Transmitting, by the DOE entity, the message to one of the first host entity and the second host entity based on the identification of whether the message is related to the first session or the second session
420

SUPPORT OF PCIe DEVICE WITH MULTIPLE SECURITY POLICIES

CROSS REFERENCE TO RELATED APPLICATIONS

The present application claims priority to International Application No. PCT/CN2021/128350, filed Nov. 3, 2021, entitled "SUPPORT OF PCI DEVICE WITH MULTIPLE SECURITY POLICIES," the entire disclosure of which is hereby incorporated by reference in its entirety for all purposes, except for those sections, if any, that are inconsistent with this specification.

FIELD

Embodiments of the present invention relate generally to the technical field of electronic circuits, and more particularly to enablement of multiple security policies between a peripheral component interconnect express (PCIe) device and a host device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The PCIe data object exchange (DOE) specification defines a way to allow a PCIe device to communicate with an entity of a host device over a connection. The connection may include one or more secure sessions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As previously noted, the PCIe data object exchange (DOE) specification defines a way to allow a PCIe device to communicate with an entity of a host device over a connection. The connection may include one or more secure sessions. In some embodiments, a connection may be referred to as a secure protocol and data model (SPDM) connection, and a session may be referred to as a SPDM session.

More specifically, a PCIe entity of the PCIe device may communicate with a DOE entity of the PCIe device. Such a PCIe entity may include, for example, a device controller running device firmware, a device operating system (OS), a device security manager (DSM), or some other software or firmware. The DOE entity of the PCIe device may establish a connection between the DOE entity of the PCIe device and a DOE entity of the host device. The DOE entity of the host device may in turn be communicatively coupled with one or more host entities of the host device. The host entities may include, for example, a basic input/output system (BIOS), an operating system (OS), a virtual machine monitor (VMM, which may also be referred to as a "Hypervisor"), a trusted security manager (TSM), or some other hardware, software, or firmware.

With respect to embodiments herein, it will be understood that the description of the different entities (e.g., the host entity, the PCIe entity, a DOE entity, etc.) is related to logical entities. For example, in real-world embodiments, a DOE entity may be implemented by its own specific processor/chip/system-on-chip (SoC)/etc. In other embodiments, the DOE entity may be a logical entity that is implemented by a processor/chip/SoC/etc. that also performs other duties or implements other logical entities of the PCIe device or the host device. Similarly, the host entity may be a processor or some other logic that is implementing the BIOS, the OS, the Hypervisor, and or the TSM.

The communication pipeline between the DOE entity of the PCIe device and the DOE entity of the host device (herein referred to as a "connection") may be used to transport secure protocol and data model (SPDM) messages between the PCIe device and the host device. SPDM messages may be used for device identification, device authentication, measurement collection, secure session establishment, etc.

Figure 1:
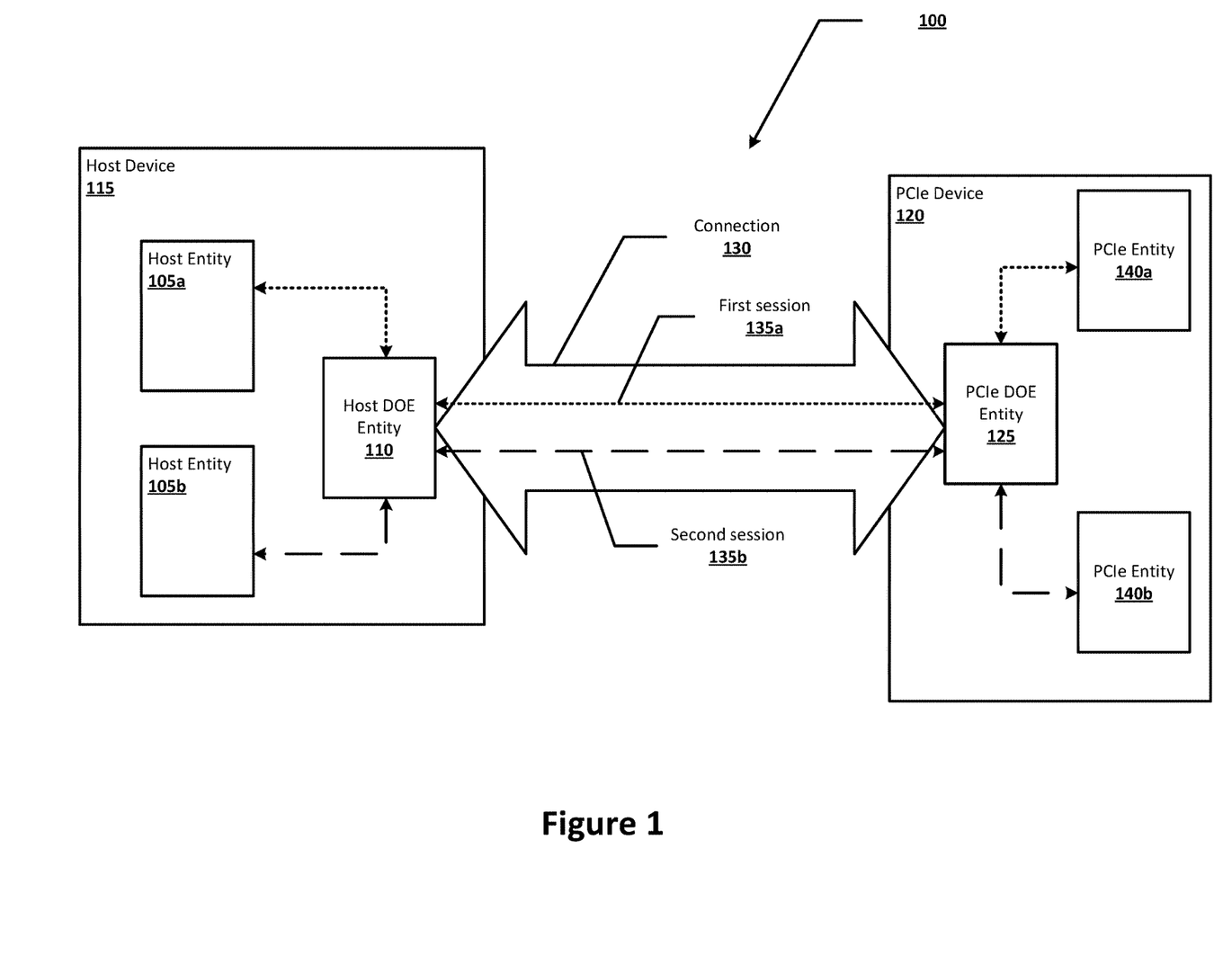
FIG. 1 illustrates an example of a connection between a host device and a PCIe device, in accordance with various embodiments.

A connection may have one or more "sessions." A session is a communication pathway of a connection that includes messages that are specific to a given host entity. Typically, a session may be subject to a given security policy (e.g., an authentication requirement, an encryption algorithm, a capability parameter, or some other security-related policy, protocol, or parameter). In some embodiments, there may be multiple sessions to a connection. Such an embodiment is depicted in FIG. 1. Specifically, FIG. 1 illustrates an example 100 of a connection between a host device 115 and a PCIe device 120, in accordance with various embodiments.

The host device may be, for example, a board of a computing device such as a motherboard or some other board. The computing device may be, for example, a personal computer (PC), a server, a gaming device, a mobile device, or some other electronic device. The PCIe device 120 may be an electronic device that is physically coupled with the host device 115 through a PCIe-based physical coupling (i.e., a PCIe slot). The PCIe device 120 may be, for example, a graphics card, a sound card, a network card, a memory card, or some other device/card/chip/peripheral/etc.

The host device 115 may include a plurality of host entities such as host entity 105a, and host entity 105b. As described above, the host entities 105a and 105b may be a BIOS, and OS, a Hypervisor, VMM, a specifically designated programmable entity, and/or some other hardware, software, and/or firmware entity. Specifically, these various host entities 105a/105b and the host DOE entity 110 may typically be respective software entities, although in other embodiments one or more of the various entities may be implemented as hardware, firmware, or combination thereof.

The host entities 105a/105b may be communicatively coupled with a host DOE entity 110.

The PCIe device 120 may similarly include a PCIe DOE entity 125 that is communicatively coupled with PCIe entities 140a and 140b. As noted above, the PCIe entities 140a and 140b may be, or may include, a software entity, a device controller running device firmware, a device operating system (OS), a device security manager (DSM), or some other hardware, software, firmware, or combination thereof.

As can be seen in FIG. 1, the host DOE entity 110 may be communicatively coupled with the PCIe DOE entity 125 by a connection 130. The connection 130 may provide for communication between the host DOE entity 110 and the PCIe DOE entity 125 as described above. Although not explicitly shown in FIG. 1 for the sake of simplicity of the Figure, a real-world implementation of the connection 130 may include one or more routers, buses, and/or some other piece of hardware and/or logic between the host DOE entity 110 and the PCIe DOE entity 125.

The connection 130 may include a plurality of session 135a and 135b. For the sake of discussion, the different sessions are indicated using different dash-patterns for the lines. The first session 135a may allow for communication between the PCIe entity 140a and host entity 105a. The second session 135b may allow for communication between the PCIe entity 140b and host entity 105b. It will be understood that, as described above, a "session" refers to a data related to a given host entity and a given PCIe entity. In some embodiments, the sessions 135a/135b may be considered to be between a point of data origination (e.g., the PCIe entity 140a or 140b) and a point of data termination (e.g., host entity 105a or 105b), or vice-versa. In other embodiments, a "session" may only refer to the data transfer between the host DOE entity 110 and the PCIe DOE entity 125.

It will also be understood that, although the PCIe device 120 is depicted as having two separate PCIe entities 140a and 140b, that are respectively communicating via the first session 135a and the second session 135b, in other embodiments both sessions 135a/135b may be communicating with a single PCIe entity. In other embodiments, a single session may communicate with a plurality of PCIe entities. Other variations may be present or possible.

As previously noted, a session may subject to a security policy. However, legacy DOE specifications may have been structured such that a single DOE entity can only support a single security policy. As a result, if PCIe entities 140a and 140b are communicating with two host entities 105a/105b in two different sessions 135a/135b, then both of the sessions 135a/135b would be subject to the same security policy. This requirement to use the same security policy may be undesirable or impractical, because different host entities 105a/104b may have different requirements, or may be incapable of coordinating with one another to effectively utilize data communication across the connection 130 using the same security policies.

As a real-world example, if host entity 105a is a TSM, then host entity 105a may implement a trust domain extension (TDX) module and a TDX-input/output (TDX-IO) provision agent (TPA) service that is used to communication with the PCIe entity 140a in a secure session to arrange a security key. Alternately, host entity 105a may implement a different mechanism for supporting trusted execution environments with direct assignment of IO devices (TEE-IO). Similarly, if host entity 105b is a Hypervisor, then it may be desirable for the Hypervisor to communicate with the PCIe entity 140b to exchange information such as device measurement, because some PCIe devices 120 may need to report a device measurement to the host device 115 in a secure session to support confidentiality. In this example, both the TSM and the Hypervisor would be in different domains, but they would have to use the same security policy. This requirement of having to use the same security policy in different domains would be undesirable, because in some cases coordination of the security policies in different domains is difficult due to a lack of coordination mechanisms, or impossible because different domains may require differing security policies.

To resolve this and other issues, embodiments herein relate to a lightweight mechanism to virtualize a DOE entity. Specifically, embodiments herein may relate to a DOE mailbox with a virtual "connection ID." It will be noted that the term "connection ID" is used herein as a generalized term, and real-world implementations or embodiments may use a different term to refer to the same concept.

Figure 2:
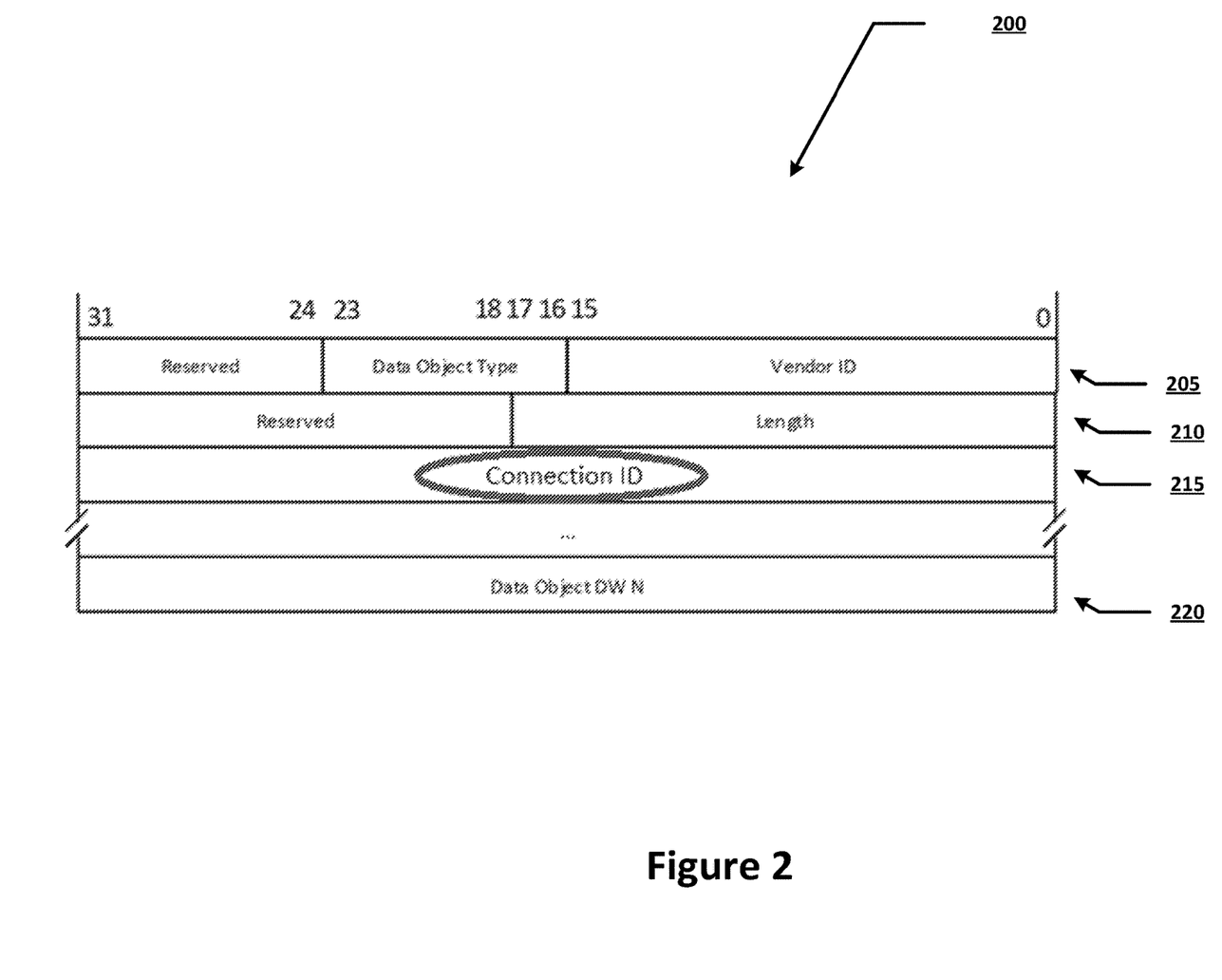
FIG. 2 depicts an example DOE mailbox with a connection identifier (ID), in accordance with various embodiments.

FIG. 2 depicts an example DOE mailbox 200 with a connection ID, in accordance with various embodiments. As used herein, a "DOE mailbox" refers to a data structure in which data (e.g., SPDM messages) may be communicated between different DOE entities (e.g., entities 110 and 125).

The DOE mailbox 200 may be organized into different data words (DWs). The first DW 205 and the second DW 210 may include header information that provides information such as a Data Object Type, a Vendor ID, a Length, etc. The third DW 215 may, in legacy systems of a DOE mailbox, include different data objects. However, in the embodiment of DOE mailbox 200, the third DW 215 may include a connection ID. The DOE mailbox 200 may then include additional data object DWs down to an nth DW 220, as shown. It will be understood that this example of the DOE mailbox 200 is intended as one illustrative example, and other embodiments may include different elements such as DWs with additional or different header information or organization, the DW with connection ID located in a different portion of the DOE mailbox 200, etc.

Different host entities (e.g., host entities 105a and 105b) may use the DOE mailbox 200 and provide different connection IDs in the third DW 215. In one embodiment, each connection ID may be unique to a given host entity. In other embodiments, a connection ID may be unique to a class of host entities. For example, if there are multiple host entities, and a subset of those host entities are the same sort of entity, then that subset may share a connection ID.

The connection IDs may be used to virtually provide different connections between the PCIe DOE entity 125 and the host DOE entity 110. Respective ones of the connections may have different sessions, and the security policies for each connection (or, more specifically, for each session within a connection) may be different from one another.

Figure 3:
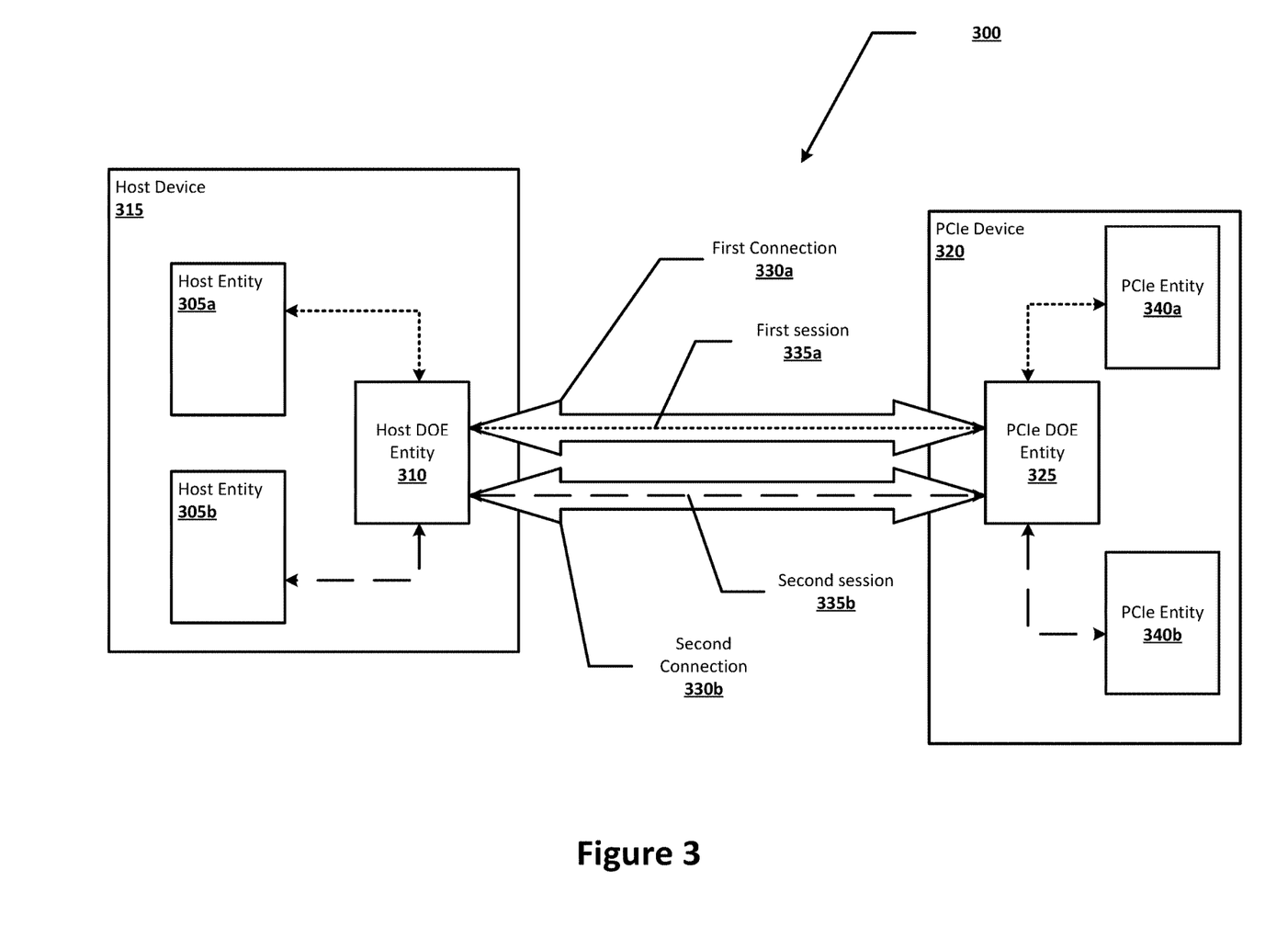
FIG. 3 illustrates an alternative example that includes multiple connections between a host device and a PCIe device, in accordance with various embodiments.

FIG. 3 depicts an example of a multi-connection scenario. Specifically, FIG. 3 illustrates an alternative example 300 that includes multiple connections between a host device 315 and a PCIe device 320, in accordance with various embodiments. Specifically, FIG. 3 depicts host entities 305a and 305b, host DOE entity 310, host device 315, PCIe device 320, PCIe DOE entity 325, and PCIe entities 340a and 340b, which may be respectively similar to, and share one or more characteristics with, host entities 105a and 105b, host DOE entity 110, host device 115, PCIe device 120, PCIe DOE entity 125, and PCIe entities 140a and 140b.

There may further be two connections 330a and 330b between the host DOE entity 310 and the PCIe DOE entity 325. The connections 330a and 330b may be respectively similar to connection 130. Respective ones of the connections 330a/330b may include a session 335a/335b, which may be similar to sessions 135a/135b.

As may be seen, rather than multiple sessions within a single connection (as is depicted in FIG. 1), connection 330a may include session 335a, and connection 330b may include session 335b. The different connections 330a/330b may be indicated by the connection ID in the third DW 215. Specifically, the connection ID related to the first session 335a may be different than the connection ID related to the second session 335b. In this way, different security policies may be applied to different ones of the sessions, resolving one or more of the issues described above.

Similarly to PCIe device 120, in some embodiments both sessions 335a/335b may be communicating with a single PCIe entity. In other embodiments, a single session (e.g., session 335a) may communicate with a plurality of PCIe entities. Other variations may be present or possible.

In order to support the use of the Connection ID in the DOE mailbox 200, it may be desirable for feature discovery to be enabled during an initial connection procedure between the host device 315 and the PCIe device 320. Specifically, the connection procedure may be implemented between the Host DOE entity 310 and the PCIe DOE entity 325 and/or the host entity 305a/305b and the PCIe entities 340a/340b. Different data object types may be used to provide information related to whether the PCIe device 320 supports use of the connection ID. Table 1, below, depicts an example of data object types that may be used in connection with DOE mailbox 200.

TABLE 1

PCIe Data Object Types

| Data Object Type | Name | Description |
| --- | --- | --- |
| 0x00 | DOE discovery | Used to discover the supported Data Object Type defined in this table |
| 0x01 | Normal SPDM | Transport normal SPDM message |
| 0x02 | Secure SPDM | Transport secure SPDM message |
| 0x80 | Feature Discovery | Used to discover the supported SPDM application feature |
| 0x81 | Normal SPDM with connection ID | Transport normal SPDM message, with connection ID |
| 0x82 | Secure SPDM with connection ID | Transport secure SPDM message, with connection ID |

In embodiments herein, the PCIe device 320 (and, more specifically, the PCIe entities 340a/340b and/or the PCIe DOE entity 325), may return Data Object Types 0x81 and/or 0x82 in the discovery phase (via Data Object Type—0x00) that occurs during initial connection of the PCIe device 320 to the host device 315. These Data Object Types may indicate that the PCIe device 320 supports the multiple connection IDs for a SPDM message.

In addition to the connection ID support, it may be desirable for the host device 315, and more specifically the host entity 305a/305b and/or the host DOE entity 310, to know features or attributes about the connection. Such features or attributes may include, for example, the maximum number of connections that the PCIe device 320 can support. This information may be provided by the PCIe device 320 using data object type 0x80. Specifically, the host device 315 would transmit a message to the PCIe device that includes the 0x80 data type. Such a message may be referred to as a "DOE feature discovery request" message. The DOE feature discovery request message may include an indication of the 0x80 Data Object Type from Table 1 in addition to one or more of the elements from the "Feature Request Type" column of Table 2.

The PCIe device 320 may then, based on the message, return an indication of one or more features or attributes of the PCIe device 320. Such a response may be referred to as a "DOE feature discovery response" message. The DOE feature discovery response message may include an indication of the 0x80 Data Object Type from Table 1 in addition to one or more of the elements from the "Feature Response Data" column of Table 2.

TABLE 2

Feature Table

| Feature Request Type | Feature Response Data | Name | Description |
|---|---|---|---|
| 0x01 | 0x00/0x01 | Component Measurement and Authentication (CMA) | Discovery if the device supports CMA |
| 0x02 | 0x00/0x01 | Integrity and Data Encryption (IDE) | Discover if the device supports IDE |
| 0x03 | 0x00/0x01 | Assignable Device Interface Security Protocol (ADI-SP) | Discover if the device supports ADI-SP |
| 0x04 | 0x00/0x01 | Memory Security Protocol (MSP) | Discover if the device supports MSP |
| 0x05 | 0x00/0x01 | Power Management (PM) | Discover if the device supports PM |
| 0x80 | UINT8 integer | Max SPDM Connection ID | Return the MAX SPDM Connection ID (start from 1) |

It will be understood that the above Tables 1 and 2 are intended as illustrative examples, and other embodiments may vary. For example, different tables may include elements with different names, different numerical designators, more or fewer elements, elements arranged in a different order, etc. In some embodiments, rather than having two separate tables (e.g., Tables 1 and 2), the information may be contained in a single table. Additionally, it will be understood that although embodiments herein are described primarily with reference to support of different SPDM sessions, a DOE mailbox such as DOE mailbox 200 that includes a Connection ID that provides support for multiple sessions between a host device and PCIe device may be applicable to other DOE-based protocols. Other embodiments may vary.

Figure 4:
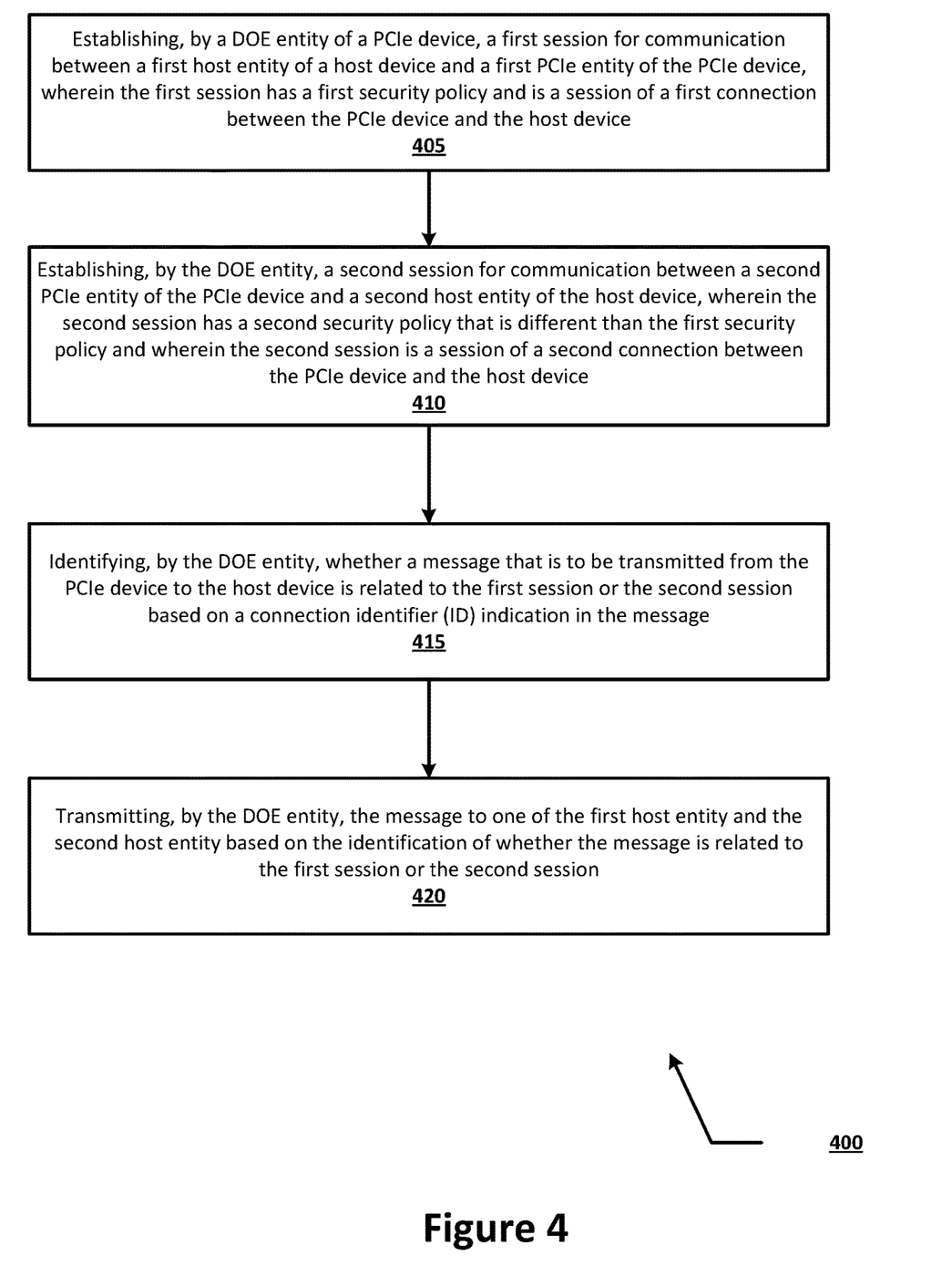
FIG. 4 depicts an example technique for communication between a PCIe device and a host device, in accordance with various embodiments.

FIG. 4 depicts an example technique 400 for communication between a PCIe device and a host device, in accordance with various embodiments. The technique may include establishing, at 405 by a DOE entity of a PCIe device (e.g., PCIe DOE entity 325 of PCIe device 320), a first session (e.g., session 335a) between a first host entity (e.g., host entity 305a) of a host device (e.g., host DOE entity 310 of host device 315) and a first PCIe entity of the PCIe device (e.g., PCIe entity 340a of PCIe device 320). In some embodiments, the first session may have a first security policy, and may be a session of a first connection (e.g., first connection 330a) between the PCIe device and the host device.

The technique 400 may further include establishing, at 410 by the DOE entity, a second session (e.g., session 335b) for communication between a second PCIe entity of the PCIe device (e.g., PCIe entity 340b) and a second host entity of the host device (e.g., host entity 305b of host device 315). In some embodiments, the second session may have a second security policy that is different than the first security policy, and the second session may be a session of a second connection (e.g., connection 330b) between the PCIe device and the host device.

The technique may further include identifying, at 415 by the DOE entity, whether a message that is to be transmitted from the PCIe device to the host device is related to the first session or the second session based on a connection ID indication in the message. Such a connection ID may be similar to the connection ID of the DOE mailbox 200 of FIG. 2.

The technique may further include transmitting, at 420 by the DOE entity, the message to one of the first host entity and the second host entity based on the identification of whether the message is related to the first session or the second session. Specifically, if the connection ID identified at 415 is related to the first host entity, then the message may be transmitted to the first host entity. Conversely, if the connection ID identified at 415 is related to the second host entity, then the message may be transmitted to the second host entity.

It will be understood that the above-described technique 400 is intended as an example technique in accordance with one embodiment of the present disclosure. Other embodiments may have more or fewer elements, elements arranged in a different order, etc. Other embodiments may vary.

Figure 5:
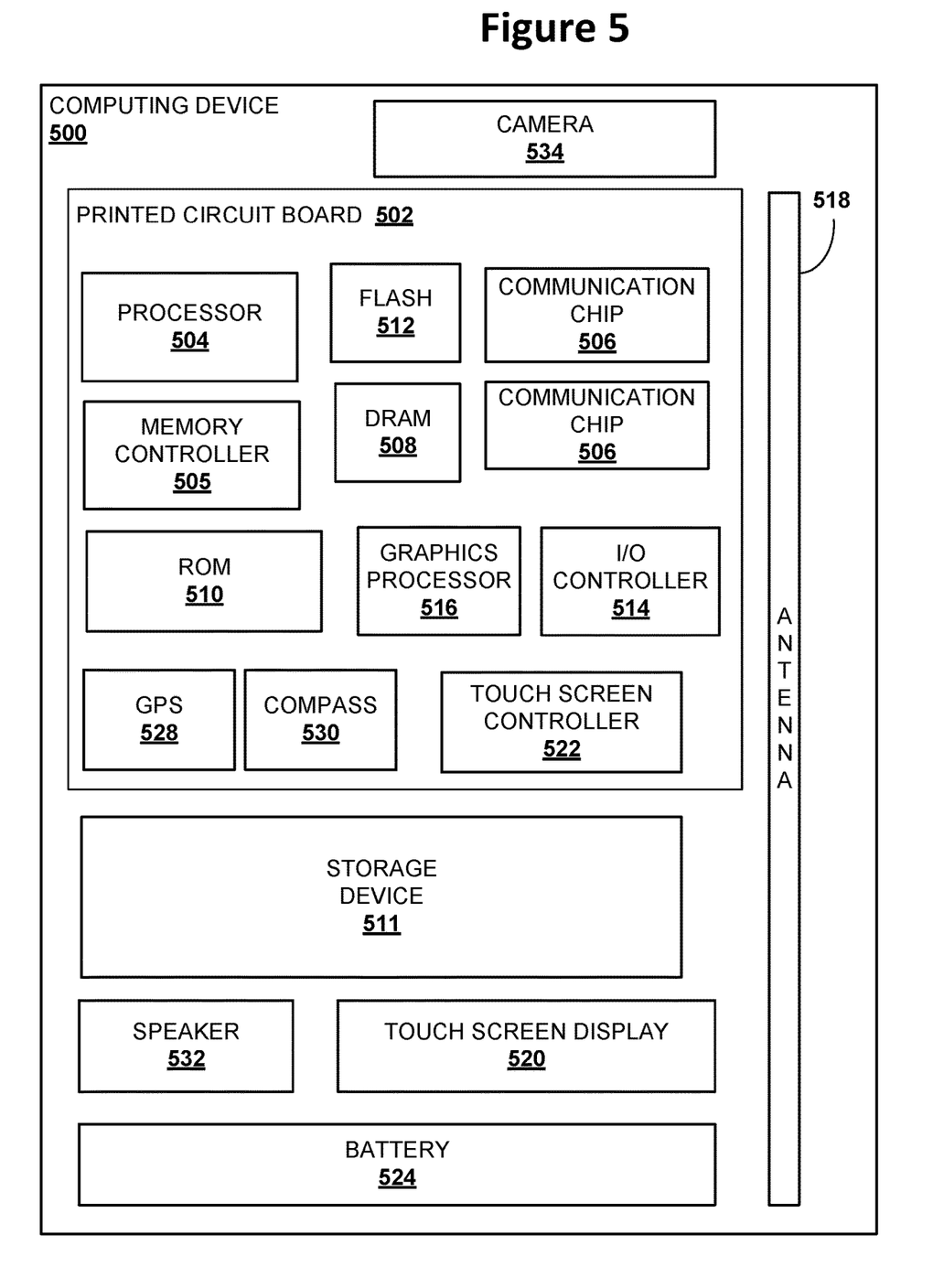
FIG. 5 illustrates an example system configured to employ the apparatuses and methods described herein, in accordance with various embodiments.

FIG. 5 illustrates an example computing device 500 that may employ the apparatuses and/or methods described herein (e.g., host device 115/315, PCIe device 120/320, technique 400, etc.), in accordance with various embodiments. As shown, computing device 500 may include a number of components, such as one or more processor(s) 504 (one shown) and at least one communication chip 506. In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, memory controller 505, volatile memory (e.g., dynamic random access memory (DRAM) 508), non-volatile memory such as read only memory (ROM) 510, flash memory 512, storage device 511 (e.g., a hard-disk drive (HDD)), an I/O controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system (GPS) device 528, a compass 530, an accelerometer (not shown), a gyroscope (not shown), a speaker 532, a camera 534, and a mass storage device (such as hard disk drive, a solid state drive, compact disk (CD), digital versatile disk (DVD)) (not shown), and so forth. In various embodiments, the processor 504 may be integrated on the same die with other components to form a System on Chip (SoC).

In some embodiments, the one or more processor(s) 504, flash memory 512, and/or storage device 511 may include associated firmware (not shown) storing programming instructions configured to enable computing device 500, in response to execution of the programming instructions by one or more processor(s) 504, to practice all or selected aspects of the methods described herein. In various embodiments, these aspects may additionally or alternatively be implemented using hardware separate from the one or more processor(s) 504, flash memory 512, or storage device 511.

In various embodiments, one or more components of the computing device 500 may include and/or employ aspects of host device 115/315, PCIe device 120/320, technique 400, and/or other circuits or techniques described herein. For example, the processor 504, communication chip 506, I/O controller 514, memory controller 505, and/or another component of computing device 500 may include and/or employ aspects of integrated circuit 100, process 200, phase lookup procedure 300, and/or other circuits or techniques described herein.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 500 may be any other electronic device that processes data.

Some non-limiting examples of various embodiments are provided below.

Example 1 includes a method to be performed by a peripheral component interconnect express (PCIe) data object exchange (DOE) hardware instance, the method comprising: establishing, by the DOE hardware instance, a first secure protocol and data model (SPDM) session with a first host software, wherein the first session has a first security protocol; establishing, by the DOE hardware instance, a second SPDM session with a second host software, wherein the second session has a second security protocol that is different than the first security protocol; and identifying, by the DOE hardware instance, whether a SPDM message is related to the first session or the second session based on a connection identification (ID) indication in the SPDM message; wherein the first session is a communication session between the first host software and a PCIe device to which the DOE hardware instance is communicatively coupled; and wherein the second session is a communication session between the second host software and the PCIe device.

Example 2 includes the method of example 1, or some other example herein, wherein the first host software is basic input/output system (BIOS) software, operating system (OS) software, a hypervisor, or a trusted security manager (TSM).

Example 3 includes the method of example 1, or some other example herein, wherein the SPDM message is related to device identification, device authentication, measurement collection, or secure session establishment.

Example 4 includes the method of example 1, or some other example herein, wherein the first session is a session of a connection between the first host software and the PCIe device.

Example 5 includes the method of example 4, or some other example herein, wherein the connection is further between the second host software and the PCIe device, and wherein the second session is a session of the connection.

Example 6 includes the method of example 4, or some other example herein, wherein the connection is a first connection and the second session is a session of a second connection between the second host software and the PCIe device.

Example 7 includes the method of example 1, or some other example herein, wherein establishment of the first session or the second session is based on an indication in a discovery message between the DOE hardware instance and the first host software, the second host software, or the PCIe device.

Example 8 includes the method of example 7, or some other example herein, wherein the indication is a data object type indication.

Example 9 includes the method of example 1, or some other example herein, wherein the SPDM message includes an indication of a feature related to the PCIe device, the first session, or the second session.

Example 10 includes the method of example 1, or some other example herein, wherein the feature is a component measurement and authentication (CMa) feature, an integrity and data encryption (IDE) feature, an assignable device interface security protocol (ADI-SP) feature, a memory security protocol (MSP) feature, a power management (PM) feature, or a maximum SPDM connection ID feature.

Example 11 includes one or more non-transitory computer-readable media comprising instructions that, upon execution of the instructions by one or more processors of an electronic device, are to cause a peripheral component interconnect express (PCIe) data object exchange (DOE) hardware instance of the electronic device to: establish, by the DOE hardware instance, a first secure protocol and data model (SPDM) session with a first host software, wherein the first session has a first security protocol; establish, by the DOE hardware instance, a second SPDM session with a second host software, wherein the second session has a second security protocol that is different than the first security protocol; and identify, by the DOE hardware instance, whether a SPDM message is related to the first session or the second session based on a connection identification (ID) indication in the SPDM message; wherein the first session is a communication session between the first host software and a PCIe device to which the DOE hardware instance is communicatively coupled; and wherein the second session is a communication session between the second host software and the PCIe device.

Example 12 includes the one or more non-transitory computer-readable media of example 11, or some other example herein, wherein the first host software is basic input/output system (BIOS) software, operating system (OS) software, a hypervisor, or a trusted security manager (TSM).

Example 13 includes the one or more non-transitory computer-readable media of example 11, or some other example herein, wherein the SPDM message is related to device identification, device authentication, measurement collection, or secure session establishment.

Example 14 includes the one or more non-transitory computer-readable media of example 11, or some other example herein, wherein the first session is a session of a connection between the first host software and the PCIe device.

Example 15 includes the one or more non-transitory computer-readable media of example 14, or some other example herein, wherein the connection is further between the second host software and the PCIe device, and wherein the second session is a session of the connection.

Example 16 includes the one or more non-transitory computer-readable media of example 14, or some other example herein, wherein the connection is a first connection and the second session is a session of a second connection between the second host software and the PCIe device.

Example 17 includes the one or more non-transitory computer-readable media of example 11, or some her example herein, wherein establishment of the first session or the second session is based on an indication in a discovery message between the DOE hardware instance and the first host software, the second host software, or the PCIe device.

Example 18 includes the one or more non-transitory computer-readable media of example 17, or some other example herein, wherein the indication is a data object type indication.

Example 19 includes the one or more non-transitory computer-readable media of example 11, or some other example herein, wherein the SPDM message includes an indication of a feature related to the PCIe device, the first session, or the second session.

Example 20 includes the one or more non-transitory computer-readable media of claim 11, or some other example herein, wherein the feature is a component measurement and authentication (CMa) feature, an integrity and data encryption (IDE) feature, an assignable device interface security protocol (ADI-SP) feature, a memory security protocol (MSP) feature, a power management (PM) feature, or a maximum SPDM connection ID feature.

Example 21 includes an electronic device comprising: one or more processors; and one or more non-transitory computer-readable media comprising instructions that, upon execution of the instructions by the one or more processors of an electronic device, are to cause a peripheral component interconnect express (PCIe) data object exchange (DOE) hardware instance of the electronic device to: establish, by the DOE hardware instance, a first secure protocol and data model (SPDM) session with a first host software, wherein the first session has a first security protocol; establish, by the DOE hardware instance, a second SPDM session with a second host software, wherein the second session has a second security protocol that is different than the first security protocol; and identify, by the DOE hardware instance, whether a SPDM message is related to the first session or the second session based on a connection identification (ID) indication in the SPDM message; wherein the first session is a communication session between the first host software and a PCIe device to which the DOE hardware instance is communicatively coupled; and wherein the second session is a communication session between the second host software and the PCIe device.

Example 22 includes the electronic device of example 21, or some other example herein, wherein the first host software is basic input/output system (BIOS) software, operating system (OS) software, a hypervisor, or a trusted security manager (TSM).

Example 23 includes the electronic device of example 21, or some other example herein, wherein the SPDM message is related to device identification, device authentication, measurement collection, or secure session establishment.

Example 24 includes the electronic device of example 21, or some other example herein, wherein the first session is a session of a connection between the first host software and the PCIe device.

Example 25 includes the electronic device of example 24, or some other example herein, wherein the connection is further between the second host software and the PCIe device, and wherein the second session is a session of the connection.

Example 26 includes the electronic device of example 24, or some other example herein, wherein the connection is a first connection and the second session is a session of a second connection between the second host software and the PCIe device.

Example 27 includes the electronic device of example 21, or some other example herein, wherein establishment of the first session or the second session is based on an indication in a discovery message between the DOE hardware instance and the first host software, the second host software, or the PCIe device.

Example 28 includes the electronic device of example 27, or some other example herein, wherein the indication is a data object type indication.

Example 29 includes the electronic device of example 21, or some other example herein, wherein the SPDM message includes an indication of a feature related to the PCIe device, the first session, or the second session.

Example 30 includes the electronic device of example 21, or some other example herein, wherein the feature is a component measurement and authentication (CMa) feature, an integrity and data encryption (IDE) feature, an assignable device interface security protocol (ADI-SP) feature, a memory security protocol (MSP) feature, a power management (PM) feature, or a maximum SPDM connection ID feature.

Example 31 includes a method to be performed by a data object exchange (DOE) entity of a peripheral component interconnect express (PCIe) device, the method comprising: establishing, by the DOE entity, a first session for communication between a first host entity of a host device and a first PCIe entity of the PCIe device, wherein the first session has a first security policy and is a session of a first connection between the PCIe device and the host device; establishing, by the DOE entity, a second session for communication between a second PCIe entity of the PCIe device and a second host entity of the host device, wherein the second session has a second security policy that is different than the first security policy and wherein the second session is a session of a second connection between the PCIe device and the host device; identifying, by the DOE entity, whether a message that is to be transmitted from the PCIe device to the host device is related to the first session or the second session based on a connection identifier (ID) indication in the message; and transmitting, by the DOE entity, the message to one of the first host entity and the second host entity based on the identification of whether the message is related to the first session or the second session.

Example 32 includes the method of example 31, or some other example herein, wherein the first host entity is an entity that implements basic input/output system (BIOS) software, an entity that implements operating system (OS) software, a hypervisor, or a trusted security manager (TSM).

Example 33 includes the method of example 31, or some other example herein, wherein the message is related to device identification, device authentication, measurement collection, or secure session establishment.

Example 34 includes the method of example 31, or some other example herein, wherein the first connection is a secure protocol and data model (SPDM) connection.

Example 35 includes the method of example 31, or some other example herein, wherein the message is a PCIe DOE message.

Example 36 includes the method of any of examples 31-35, or some other example herein, wherein establishment of the first session and the second session is based on an indication in a discovery message between the PCIe device and the host device.

Example 37 includes the method of example 36, or some other example herein, wherein the indication in the discovery message is a data object type indication.

Example 38 includes the method of example 36, or some other example herein, wherein the discovery message further includes an indication of a feature of the PCIe device.

Example 39 includes the method of example 38, or some other example herein, wherein the feature is a component measurement and authentication (CMA) feature, an integrity and data encryption (IDE) feature, an assignable device interface security protocol (ADI-SP) feature, a memory security protocol (MSP) feature, a power management (PM) feature, or a maximum SPDM connection ID feature.

Example 40 includes the method of any of examples 31-35, or some other example herein, wherein the security policy relates to an authentication requirement, an encryption algorithm, or a capability parameter of data related to a session.

Example 41 includes one or more non-transitory computer-readable media comprising instructions that, upon execution of the instructions by one or more processors of a peripheral component interconnect express (PCIe) device, are to cause a data object exchange (DOE) entity of the PCIe device to: establish, by the DOE entity, a first session for communication between a first host entity of a host device and a first PCIe entity of the PCIe device, wherein the first session has a first security policy and is a session of a first connection between the PCIe device and the host device; establish, by the DOE entity, a second session for communication between a second PCIe entity of the PCIe device and a second host entity of the host device, wherein the second session has a second security policy that is different than the first security policy and wherein the second session is a session of a second connection between the PCIe device and the host device; identify, by the DOE entity, whether a message that is to be transmitted from the PCIe device to the host device is related to the first session or the second session based on a connection identifier (ID) indication in the message; and transmit, by the DOE entity, the message to one of the first host entity and the second host entity based on the identification of whether the message is related to the first session or the second session.

Example 42 includes the one or more non-transitory computer-readable media of example 41, or some other example herein, wherein the first host entity is an entity that implements basic input/output system (BIOS) software, an entity that implements operating system (OS) software, a hypervisor, or a trusted security manager (TSM).

Example 43 includes the one or more non-transitory computer-readable media of example 41, or some other example herein, wherein the message is related to device identification, device authentication, measurement collection, or secure session establishment.

Example 44 includes the one or more non-transitory computer-readable media of example 41, or some other example herein, wherein the first connection is a secure protocol and data model (SPDM) connection.

Example 45 includes the one or more non-transitory computer-readable media of example 41, or some other example herein, wherein the message is a PCIe DOE message.

Example 46 includes the one or more non-transitory computer-readable media of any of examples 41-45, or some other example herein, wherein establishment of the first session and the second session is based on an indication in a discovery message between the PCIe device and the host device.

Example 47 includes the one or more non-transitory computer-readable media of example 46, or some other example herein, wherein the indication in the discovery message is a data object type indication.

Example 48 includes the one or more non-transitory computer-readable media of example 46, or some other example herein, wherein the discovery message further includes an indication of a feature of the PCIe device.

Example 49 includes the one or more non-transitory computer-readable media of example 48, or some other example herein, wherein the feature is a component measurement and authentication (CMA) feature, an integrity and data encryption (IDE) feature, an assignable device interface security protocol (ADI-SP) feature, a memory security protocol (MSP) feature, a power management (PM) feature, or a maximum SPDM connection ID feature.

Example 50 includes the one or more non-transitory computer-readable media of any of examples 41-45, or some other example herein, wherein the security policy relates to an authentication requirement, an encryption algorithm, or a capability parameter of data related to a session.

Example 51 includes a peripheral component interconnect express (PCIe) device comprising: one or more processors to implement a data object exchange (DOE) entity; and one or more non-transitory computer-readable media comprising instructions that, upon execution of the instructions by the one or more processors, are to cause the DOE to: establish, by the DOE entity, a first session for communication between a first host entity of a host device and a first PCIe entity of the PCIe device, wherein the first session has a first security policy and is a session of a first connection between the PCIe device and the host device; establish, by the DOE entity, a second session for communication between a second PCIe entity of the PCIe device and a second host entity of the host device, wherein the second session has a second security policy that is different than the first security policy and wherein the second session is a session of a second connection between the PCIe device and the host device; identify, by the DOE entity, whether a message that is to be transmitted from the PCIe device to the host device is related to the first session or the second session based on a connection identifier (ID) indication in the message; and transmit, by the DOE entity, the message to one of the first host entity and the second host entity based on the identification of whether the message is related to the first session or the second session.

Example 52 includes the PCIe device of example 51, or some other example herein, wherein the first host entity is an entity that implements basic input/output system (BIOS) software, an entity that implements operating system (OS) software, a hypervisor, or a trusted security manager (TSM).

Example 53 includes the PCIe device of example 51, or some other example herein, wherein the message is related to device identification, device authentication, measurement collection, or secure session establishment.

Example 54 includes the PCIe device of example 51, or some other example herein, wherein the first connection is a secure protocol and data model (SPDM) connection.

Example 55 includes the PCIe device of example 51, or some other example herein, wherein the message is a PCIe DOE message.

Example 56 includes the PCIe device of any of examples 51-55, or some other example herein, wherein establishment of the first session and the second session is based on an indication in a discovery message between the PCIe device and the host device.

Example 57 includes the PCIe device of example 56, or some other example herein, wherein the indication in the discovery message is a data object type indication.

Example 58 includes the PCIe device of example 56, or some other example herein, wherein the discovery message further includes an indication of a feature of the PCIe device.

Example 59 includes the PCIe device of example 58, or some other example herein, wherein the feature is a component measurement and authentication (CMA) feature, an integrity and data encryption (IDE) feature, an assignable device interface security protocol (ADI-SP) feature, a memory security protocol (MSP) feature, a power management (PM) feature, or a maximum SPDM connection ID feature.

Example 60 includes the PCIe device of any of examples 51-55, or some other example herein, wherein the security policy relates to an authentication requirement, an encryption algorithm, or a capability parameter of data related to a session.

Example 61 includes an apparatus comprising means to: establish, by the DOE entity, a first session for communication between a first host entity of a host device and a first PCIe entity of the PCIe device, wherein the first session has a first security policy and is a session of a first connection between the PCIe device and the host device; establish, by the DOE entity, a second session for communication between a second PCIe entity of the PCIe device and a second host entity of the host device, wherein the second session has a second security policy that is different than the first security policy and wherein the second session is a session of a second connection between the PCIe device and the host device; identify, by the DOE entity, whether a message that is to be transmitted from the PCIe device to the host device is related to the first session or the second session based on a connection identifier (ID) indication in the message; and transmit, by the DOE entity, the message to one of the first host entity and the second host entity based on the identification of whether the message is related to the first session or the second session.

Example 62 includes the apparatus of example 61, or some other example herein, wherein the first host entity is an entity that implements basic input/output system (BIOS) software, an entity that implements operating system (OS) software, a hypervisor, or a trusted security manager (TSM).

Example 63 includes the apparatus of example 61, or some other example herein, wherein the message is related to device identification, device authentication, measurement collection, or secure session establishment.

Example 64 includes the apparatus of example 61, or some other example herein, wherein the first connection is a secure protocol and data model (SPDM) connection.

Example 65 includes the apparatus of example 61, or some other example herein, wherein the message is a PCIe DOE message.

Example 66 includes the apparatus of any of examples 61-65, or some other example herein, wherein establishment of the first session and the second session is based on an indication in a discovery message between the PCIe device and the host device.

Example 67 includes the apparatus of example 66, or some other example herein, wherein the indication in the discovery message is a data object type indication.

Example 68 includes the apparatus of example 66, or some other example herein, wherein the discovery message further includes an indication of a feature of the PCIe device.

Example 69 includes the apparatus of example 68, or some other example herein, wherein the feature is a component measurement and authentication (CMA) feature, an integrity and data encryption (IDE) feature, an assignable device interface security protocol (ADI-SP) feature, a memory security protocol (MSP) feature, a power management (PM) feature, or a maximum SPDM connection ID feature.

Example 70 includes the apparatus of any of examples 61-65, or some other example herein, wherein the security policy relates to an authentication requirement, an encryption algorithm, or a capability parameter of data related to a session.

Example 71 includes a method comprising the method of or related to any of examples 1-60, or elements or portions thereof.

Example 72 includes an apparatus to perform the method of or related to any of examples 1-60, or elements or portions thereof.

Example 73 includes one or more non-transitory computer-readable media comprising instructions that, upon execution of the instructions by one or more processors of an electronic device, are to cause the electronic device to perform the method of or related to any of examples 1-60, or elements or portions thereof.

Example 74 includes an apparatus comprising means to perform the method of or related to any of examples 1-60, or elements or portions thereof.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A peripheral component interconnect express (PCIe) device comprising:

one or more processors to implement a data object exchange (DOE) entity; and
one or more non-transitory computer-readable media comprising instructions that, upon execution of the instructions by the one or more processors, are to cause the DOE to:
establish, by the DOE entity, a first session for communication between a first host entity of a host device and a first PCIe entity of the PCIe device, wherein the first session has a first security policy and is a session of a first connection between the PCIe device and the host device;
establish, by the DOE entity, a second session for communication between a second PCIe entity of the PCIe device and a second host entity of the host device, wherein the second session has a second security policy that is different than the first security policy and wherein the second session is a session of a second connection between the PCIe device and the host device;
identify, by the DOE entity, whether a message that is to be transmitted from the PCIe device to the host device is related to the first session or the second session based on a connection identifier (ID) indication in the message; and
transmit, by the DOE entity, the message to one of the first host entity and the second host entity based on the identification of whether the message is related to the first session or the second session.

2. The PCIe device of claim 1, wherein the first host entity is an entity that implements basic input/output system (BIOS) software, an entity that implements operating system (OS) software, a hypervisor, or a trusted security manager (TSM).

3. The PCIe device of claim 1, wherein the message is related to device identification, device authentication, measurement collection, or secure session establishment.

4. The PCIe device of claim 1, wherein the first connection is a secure protocol and data model (SPDM) connection.

5. The PCIe device of claim 1, wherein the message is a PCIe DOE message.

6. The PCIe device of claim 1, wherein establishment of the first session and the second session is based on an indication in a discovery message between the PCIe device and the host device.

7. The PCIe device of claim 6, wherein the indication in the discovery message is a data object type indication.

8. The PCIe device of claim 6, wherein the discovery message further includes an indication of a feature of the PCIe device.

9. The PCIe device of claim 8, wherein the feature is a component measurement and authentication (CMA) feature, an integrity and data encryption (IDE) feature, an assignable device interface security protocol (ADI-SP) feature, a memory security protocol (MSP) feature, a power management (PM) feature, or a maximum SPDM connection ID feature.

10. The PCIe device of claim 1, wherein the security policy relates to an authentication requirement, an encryption algorithm, or a capability parameter of data related to a session.

11. One or more non-transitory computer-readable media comprising instructions that, upon execution of the instructions by one or more processors of a peripheral component interconnect express (PCIe) device, are to cause a data object exchange (DOE) entity of the PCIe device to:
establish, by the DOE entity, a first session for communication between a first host entity of a host device and a first PCIe entity of the PCIe device, wherein the first session has a first security policy and is a session of a first connection between the PCIe device and the host device;
establish, by the DOE entity, a second session for communication between a second PCIe entity of the PCIe device and a second host entity of the host device, wherein the second session has a second security policy that is different than the first security policy and wherein the second session is a session of a second connection between the PCIe device and the host device;
identify, by the DOE entity, whether a message that is to be transmitted from the PCIe device to the host device is related to the first session or the second session based on a connection identifier (ID) indication in the message; and
transmit, by the DOE entity, the message to one of the first host entity and the second host entity based on the identification of whether the message is related to the first session or the second session.

12. The one or more non-transitory computer-readable media of claim 11, wherein the first host entity is an entity that implements basic input/output system (BIOS) software, an entity that implements operating system (OS) software, a hypervisor, or a trusted security manager (TSM).

13. The one or more non-transitory computer-readable media of claim 11, wherein the message is related to device identification, device authentication, measurement collection, or secure session establishment.

14. The one or more non-transitory computer-readable media of claim 11, wherein establishment of the first session and the second session is based on an indication in a discovery message between the PCIe device and the host device.

15. The one or more non-transitory computer-readable media of claim 11, wherein the security policy relates to an authentication requirement, an encryption algorithm, or a capability parameter of data related to a session.

16. A method to be performed by a data object exchange (DOE) entity of a peripheral component interconnect express (PCIe) device, the method comprising:
establishing, by the DOE entity, a first session for communication between a first host entity of a host device and a first PCIe entity of the PCIe device, wherein the first session has a first security policy and is a session of a first connection between the PCIe device and the host device;
establishing, by the DOE entity, a second session for communication between a second PCIe entity of the PCIe device and a second host entity of the host device, wherein the second session has a second security policy that is different than the first security policy and wherein the second session is a session of a second connection between the PCIe device and the host device;
identifying, by the DOE entity, whether a message that is to be transmitted from the PCIe device to the host device is related to the first session or the second session based on a connection identifier (ID) indication in the message; and
transmitting, by the DOE entity, the message to one of the first host entity and the second host entity based on the identification of whether the message is related to the first session or the second session.

17. The method of claim 16, wherein the first host entity is an entity that implements basic input/output system (BIOS) software, an entity that implements operating system (OS) software, a hypervisor, or a trusted security manager (TSM).

18. The method of claim 16, wherein the message is related to device identification, device authentication, measurement collection, or secure session establishment.

19. The method of claim 16, wherein establishment of the first session and the second session is based on an indication in a discovery message between the PCIe device and the host device.

20. The method of claim 16, wherein the security policy relates to an authentication requirement, an encryption algorithm, or a capability parameter of data related to a session.

* * * * *